(12) United States Patent
Mullins

(10) Patent No.: US 7,937,882 B2
(45) Date of Patent: May 10, 2011

(54) BUOY HOLDER FOR FISH CULLING

(76) Inventor: Jeffery L Mullins, Douglasville, GA (US)

( * ) Notice: Subject to any disclaimer, the term of this patent is extended or adjusted under 35 U.S.C. 154(b) by 80 days.

(21) Appl. No.: 12/256,920

(22) Filed: Oct. 23, 2008

(65) Prior Publication Data

US 2009/0107028 A1    Apr. 30, 2009

Related U.S. Application Data

(60) Provisional application No. 60/981,860, filed on Oct. 23, 2007.

(51) Int. Cl.
*A01K 97/06* (2006.01)
(52) U.S. Cl. .................. 43/4; 43/54.1; 206/315.11
(58) Field of Classification Search ............ 43/54.1, 43/4, 315.11, 920, 21.2, 57.2, 57.3, 57.1; 211/70.8; 206/315.11; 224/920
See application file for complete search history.

(56) References Cited

U.S. PATENT DOCUMENTS

| | | | | |
|---|---|---|---|---|
| 2,548,080 A | * | 4/1951 | Thorn | 43/54.1 |
| 2,817,472 A | * | 12/1957 | Parkhurst | 224/920 |
| 2,826,853 A | * | 3/1958 | Guy et al. | 43/57.1 |
| 3,007,618 A | * | 11/1961 | Davis et al. | 224/411 |
| 3,033,360 A | * | 5/1962 | Ledoux | 43/54.1 |
| 3,115,287 A | * | 12/1963 | McGrew | 224/920 |
| 3,350,810 A | * | 11/1967 | Warner et al. | 43/57.1 |
| 3,561,652 A | * | 2/1971 | Ruter | 224/103 |
| 3,832,798 A | * | 9/1974 | Pilston | 43/57.2 |
| 3,897,650 A | * | 8/1975 | Pilston | 43/54.1 |
| 4,328,916 A | * | 5/1982 | Lucas | 224/103 |
| 4,383,385 A | * | 5/1983 | Myers | 224/920 |
| 4,484,405 A | * | 11/1984 | Woods | 43/4 |
| 4,589,546 A | * | 5/1986 | Sunderland | 43/57.1 |
| 4,753,031 A | * | 6/1988 | Owen | 43/54.1 |
| 4,813,173 A | * | 3/1989 | Abbotoy | 43/57.1 |
| 4,827,658 A | * | 5/1989 | Wolniak | 43/54.1 |
| 4,871,099 A | * | 10/1989 | Bogar, Jr. | 43/21.2 |
| 4,927,395 A | * | 5/1990 | Saulnier et al. | 43/54.1 |
| 4,947,577 A | * | 8/1990 | Abbotoy | 43/57.1 |
| 5,095,645 A | * | 3/1992 | Borawski | 43/57.1 |
| 5,311,698 A | * | 5/1994 | Plost | 43/54.1 |
| D352,089 S | * | 11/1994 | Barber et al. | D22/147 |
| 5,410,836 A | * | 5/1995 | Hardy | 43/57.1 |
| 5,425,196 A | * | 6/1995 | Schwarze | 43/54.1 |
| 5,435,473 A | * | 7/1995 | Larkum | 211/70.8 |
| 5,475,944 A | * | 12/1995 | Mathews | 43/57.3 |

(Continued)

FOREIGN PATENT DOCUMENTS

DE    4341051 C1 *  5/1995

(Continued)

*Primary Examiner* — Darren W Ark
(74) *Attorney, Agent, or Firm* — Smith Risley Tempel Santos LLC; Gregory Scott Smith

(57) ABSTRACT

A culling buoy holder that includes multiple tubes laid side by side in a parallel fashion and affixed to a mounting structure or to each other. The tubes are sized in length and diameter such that a culling buoy may be inserted down through the bore of a tube, with a float first orientation, until the float dangles below the lower open end of the tube. Further, while tube bore sizes are large enough to permit the passing of a buoy float, they are small enough that the clipping apparatus comprising the opposite end of the buoy cannot pass. Advantageously, each buoy, once inserted through an individual tube of the buoy holder, is effectively separated from other buoys as it securely hangs in its individual tube.

5 Claims, 3 Drawing Sheets

U.S. PATENT DOCUMENTS

| | | | |
|---|---|---|---|
| 5,657,573 A * | 8/1997 | Fischer et al. | 43/57.1 |
| 5,715,952 A * | 2/1998 | Chichetti | 211/70.8 |
| 5,761,843 A * | 6/1998 | Lynch et al. | 43/4.5 |
| 5,813,528 A * | 9/1998 | Bliek et al. | 43/57.1 |
| 5,815,976 A * | 10/1998 | Jernigan et al. | 43/21.2 |
| 5,934,464 A * | 8/1999 | Vargo et al. | 43/57.1 |
| 5,979,752 A * | 11/1999 | Holloway | 43/4 |
| 5,987,808 A * | 11/1999 | Coles | 43/55 |
| 6,003,748 A * | 12/1999 | Rivenbark | 43/21.2 |
| 6,029,391 A * | 2/2000 | Holley et al. | 43/4 |
| 6,044,582 A * | 4/2000 | Johnson | 43/4 |
| 6,092,325 A * | 7/2000 | Walker | 43/43.11 |
| D458,878 S * | 6/2002 | Greco | D12/162 |
| 6,405,478 B1 * | 6/2002 | Westley | 43/54.1 |
| 6,405,882 B1 * | 6/2002 | Baxter | 211/74 |
| 6,427,834 B1 * | 8/2002 | Lin | 43/54.1 |
| 6,530,170 B1 * | 3/2003 | Sweeney | 43/21.2 |
| 6,533,151 B1 * | 3/2003 | Link | 224/251 |
| 6,658,786 B1 * | 12/2003 | Williams | 43/54.1 |
| 6,679,377 B2 * | 1/2004 | Maddox | 43/54.1 |
| 6,766,610 B1 * | 7/2004 | Lin | 43/54.1 |
| 6,862,834 B2 * | 3/2005 | Basch | 43/54.1 |
| 6,883,268 B2 * | 4/2005 | Fraser | 43/54.1 |
| 6,962,018 B1 * | 11/2005 | King | 43/21.2 |
| 6,981,624 B2 * | 1/2006 | Link et al. | 206/315.11 |
| 7,055,281 B1 * | 6/2006 | Faneuf | 43/43.1 |
| 7,150,123 B1 * | 12/2006 | Fox | 43/54.1 |
| 7,305,793 B1 * | 12/2007 | Macdonald | 43/54.1 |
| 7,322,149 B1 * | 1/2008 | Quintero | 206/315.11 |
| 7,594,353 B2 * | 9/2009 | Lucky | 43/21.2 |
| 2003/0041503 A1 * | 3/2003 | Marjerison et al. | 43/54.1 |
| 2003/0051388 A1 * | 3/2003 | Barnes et al. | 43/21.2 |
| 2003/0217499 A1 * | 11/2003 | Cheek, Jr. | 43/21.2 |
| 2005/0178041 A1 * | 8/2005 | Zaffiro | 43/21.2 |
| 2005/0235548 A1 * | 10/2005 | Barron et al. | 43/21.2 |
| 2005/0257417 A1 * | 11/2005 | Black et al. | 43/21.2 |
| 2005/0279013 A1 * | 12/2005 | Iwaniec | 43/54.1 |
| 2007/0119093 A1 * | 5/2007 | Jaskulski | 43/54.1 |
| 2007/0256348 A1 * | 11/2007 | Fox | 43/54.1 |
| 2008/0222941 A1 * | 9/2008 | Scrimgeour | 43/54.1 |
| 2008/0271361 A1 * | 11/2008 | Greaves | 43/54.1 |
| 2009/0230160 A1 * | 9/2009 | Crawford et al. | 43/4 |
| 2010/0108626 A1 * | 5/2010 | Sorensen | 211/70.8 |

FOREIGN PATENT DOCUMENTS

| | | | |
|---|---|---|---|
| DE | 10226000 B3 * | 1/2004 | |
| GB | 2187721 A * | 9/1987 | |
| JP | 09009844 A * | 1/1997 | |
| JP | 09154464 A * | 6/1997 | |
| JP | 10327729 A * | 12/1998 | |

* cited by examiner

BUOY HOLDER FOR FISH CULLING

CROSS-REFERENCE TO RELATED APPLICATIONS

This application is being filed under 35 USC 111 and 37 CFR 1.53(b) and claims the benefit of the filing date of the United States Provisional Application for patent that was filed on Oct. 23, 2007 and assigned Ser. No. 60/981,860, which is also herein incorporated by reference in its entirety.

BACKGROUND OF THE INVENTION

You can't catch a fish unless your hook is in the water, or so the saying goes. Professional fishermen can take that adage one step further—that is you can't make money catching fish unless your hook is in the water. Professional fishing circuits are highly competitive and the difference between finishing a tournament in the money versus just spending a lot of money to be in a tournament often comes down to the amount of time during tournament hours that a fisherman is able to devote to the business of fishing. Exercises such as tying on new baits, modifying equipment, fiddling with trolling motors and untangling marker buoys are necessary evils that take away from productive fishing time. Consequently, a typical tournament fisherman will employ any method or apparatus that will increase his efficiency while on the water.

Perhaps one of the most inconvenient and inefficient tasks that must be managed by a tournament fisherman is the process of culling his live well. In many fishing tournaments, there is a limit as to the number of fish that a competitor may bring to the scales. Therefore, when a tournament fishermen has boated the maximum number of fish allowed by the tournament, the process of culling the live well begins. Culling is nothing more than the process of releasing the smallest fish in the live well once a larger one is caught. Put another way, tournament fishermen are always "trading up" in an effort to increase the overall weight of their catch. As one can imagine, an exorbitant amount of valuable fishing time can be wasted trying to corner the smallest fish in the live well. In fact, if a tournament fisherman isn't careful, he'll end up doing most of his fishing in the live well instead of in the lake.

There are many products available to tournament fishermen to help improve the efficiency of managing the live well culling process. The most popular systems are usually a series of small, color coded buoys each tethered to a clipping apparatus. When a fish is caught, the fisherman threads a clip through the fish's mouth making sure that it exits the gills before locking the clip. The coded buoy, which is tethered to the clip, floats on top of the water in the live well thereby providing a quick and easy way to identify and remove a specific fish.

Buoy based culling systems such as the one outlined above are very simple, and generally efficient, solutions for live well management during a tournament. The shortfall of those systems, however, is experienced before the buoys are in ever in use. At the cost of valuable fishing time, inefficient organization and storage of the buoys can cause tethers to tangle and buoys to become lost.

Prior art techniques for management of culling buoys are inadequate. They do not facilitate the storage, order, and ease of access for the buoys. In a fishing environment, especially tournament fishing, it is imperative to be able to quickly access the culling buoys, cull the fish, and get back to the business of catching the next largest fish. Thus, there is a need in the art for a device to help hold culling buoys, provide ease of access to the culling buoys and maintain order.

BRIEF SUMMARY OF THE INVENTION

A buoy holder is an apparatus designed to organize fish culling buoys. A fish culling system that includes a buoy holder may also include, in addition to the buoy holder, a series of color-coded or sequentially numbered buoys operable to be tethered to a single fish. The primary purpose of the buoys is to provide a quick means of identification for specific fish in a tournament fisherman's live well. With identification of the smallest fish in the live well, a tournament fisherman can "cull" the fish by replacing it with a larger fish that has just been caught.

One embodiment of the invention comprises a series of tubes, open at each end, and molded together such that each of the tubes shares the same plane with each of the other tubes. The tubes may be sized in length and diameter such that a culling buoy may be inserted down through the bore of a tube, with a float first orientation, until the float dangles below the lower open end of the tube. Further, while tube bore sizes are large enough to permit the passing of a buoy float, they are small enough that the clipping apparatus comprising the opposite end of the buoy cannot. Advantageously, each buoy, once inserted through an individual tube of the buoy holder, is effectively separated from other buoys as it securely hangs in its individual tube. In some embodiments, the buoy holder may also be fitted with mounting tabs that can be secured to a surface via machine screws, snaps, Velcro or some other fastener available to one skilled in the art. Still other embodiments may comprise aspects such as numbers, letters, colors, or some other coding system on the buoy holder that corresponds to specific buoys.

DETAILED DESCRIPTION OF THE INVENTION

Figure 1:
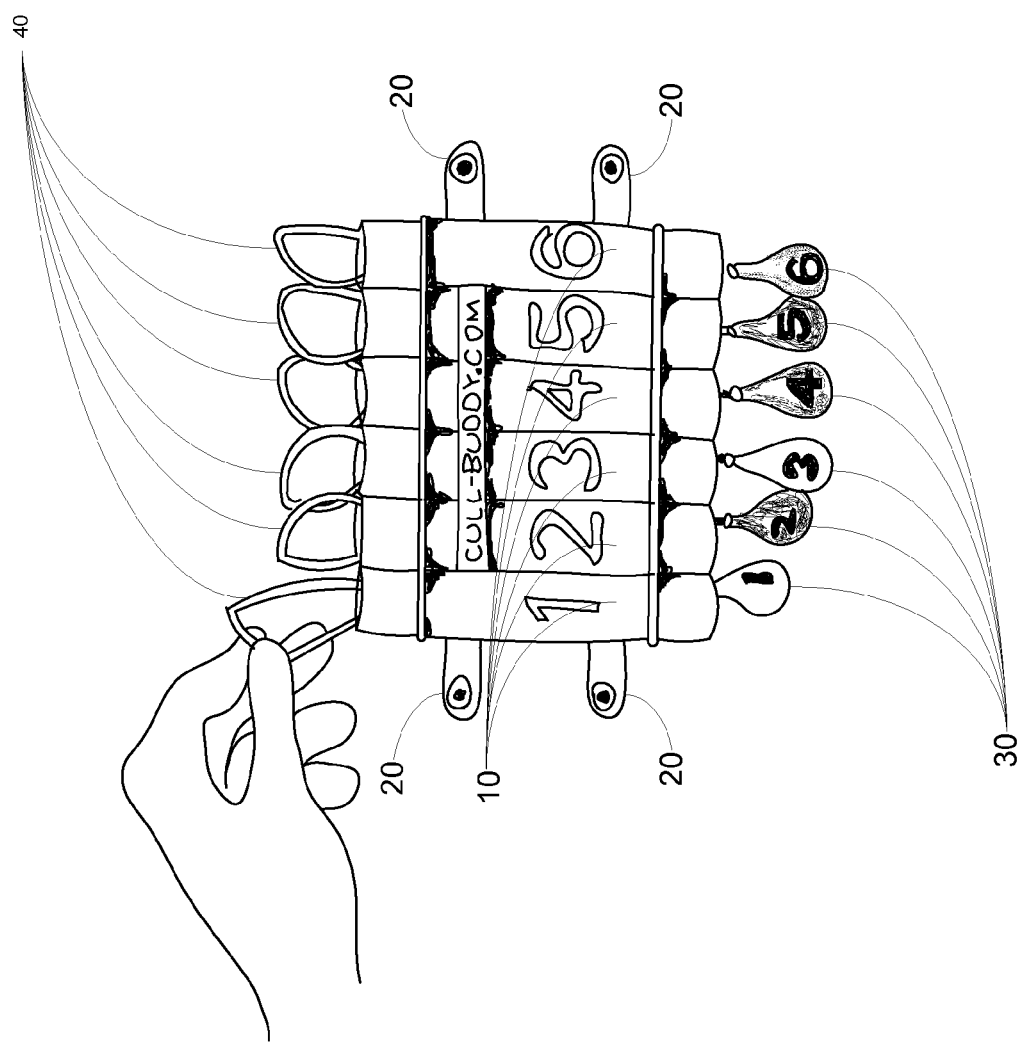
FIG. 1 is a perspective view of a culling system comprising one embodiment of a buoy holder and a set of buoys.

The present invention, as well as features and aspects thereof, is directed towards providing a device that can hold culling buoys and provide ease of access to the same.

In general, one embodiment of the device includes multiple tubes that are laid side by side in a parallel fashion and affixed to a mounting structure or simply to each other. In one embodiment the tubes have a round cross section and are sized in such a way as to allow the buoy float and tether to be fed through the tube but that will not allow the clipping apparatus at the end of the culling buoy to pass through the interior diameter of the tube. However, it will be appreciated that the device can use a variety of tube shapes and still embody aspects of the present invention.

The device can be tooled, machined, cast or assembled from parts and be made out of a variety of materials including all varieties of plastics, metals and wood, as well as any combination thereof.

In a particular embodiment, the device is structured to be mounted to the underside of the live well lid. Thus, when the live well lid is opened, a user can easily gain access to a culling buoy to cull the fish and drop it into the live well.

The device may also be constructed with holders on the clip end to further facilitate holding the culling buoys in place. For instance, in one embodiment magnets can be used to help facilitate holding of the clips in place. In another embodiment, clamps can be installed on the clip end of the tubes to further hold the culling buoy. Other embodiments may include sticky substances, Velcro, pins, fasteners, etc. In another embodiment, the tubes may be structured with a slit that will receive the tether of the culling buoy, similar to the slit in a spool of thread, and that will hold the culling buoy in place by friction.

The tubes can be laid side by side in a parallel fashion onto a flat surface or bars to be mounted onto a flat surface. However, the tubes may also be stacked on top of each other, arranged in a pyramid type structure, or otherwise arranged in close proximity to each other. In addition, the tube may in actuality be a single tube with multiple channels extending through the tube with each channel housing a culling buoy.

Embodiments of the present invention may also include a capping system, operable to provide better security while the culling system is not in use. For instance, a cap can be placed on the end of the tube that the buoy extends out of. The cap may either completely cover the surface and as such the buoy must be pushed up into the tube prior to attaching the cap or, the cap may include a slit, cut, groove or opening that allows the cap to be put into place but that enables to the buoy to still hang outside of the tube. Alternatively, embodiments of the present invention may utilize a cup-like or test tube-like system rather than tubes. The cup-like system includes a bottom that would prevent the buoy portion from extending out of the bottom. In such an embodiment, the cups can be coded to facilitate differentiating the various culling buoys. Thus, culling buoys can be loaded into such an embodiment based on the coding system. In other embodiments, the tubes or cups can be transparent. In the cup-like embodiment, the transparency of the cup further allows the coding of the culling buoys to be observed without a coded buoy having to dangle from the bottom of a tube opening.

On the other ends of the tubes, a cap can be constructed so as to include a groove for the clip and such that the cap can be placed over the tube opening with the clip extending through the cap. In another embodiment, rather than a cap, a rod or pin may be extended across the opening of the tube in such a manner that it extends through the clip thereby preventing the clip from falling out of the tube.

Furthermore, a case suitably operable to house the culling buoy of the present invention can be constructed. Such a feature would allow for inserting a culling buoy holder, either empty, partially or fully populated, and holding all of the items in place for ease of transportation.

As previously mentioned, embodiments of the invention can be mounted to, or integrated with, the inside lid of a live well. However, it will be appreciated that in other embodiments, the present invention may be provided in a mountable unit that can be easily mounted to a variety of surfaces including, but not limited to, the back of a seat, the deck of a boat, the walls of a boat, or even on the person of an angler. For instance, the device could be mounted with Velcro, self-tapping screws, clamps, clips, straps, double-sided tape, suction cups, or the like. In addition, embodiments of the present invention may include a pull out stand that can be used to set up the device in an easily accessible location. Furthermore, as mentioned above, the device could be strapped to an individual. For instance, the tubes could be attached to a pliable material, such as cloth or canvas, and then strapped around an angler's leg or waist to provide convenience of access and for portability. Advantageously, the portable embodiments of the present invention enable a tournament angler to use the culling device in any boat by simply porting the system along with his or her other equipment. For instance, in a carrying case or brief case embodiment, the angler can carry the case with him and mount the case to a surface in the boat. This embodiment has the further advantage of protecting and keeping the culling buoys organized in transit. Furthermore, the case may be structured in a waterproof manner.

Turning now to the figures, where like labels represent like elements throughout the drawings, various aspects, features and embodiments of the present invention will be presented in more detail. The examples as set forth in the drawings and detailed description are provided by way of explanation of the invention and are not meant as limitations of the invention. The present invention thus includes any modifications and variations of the following examples as come within the scope of the appended claims and their equivalents.

Figure 2:
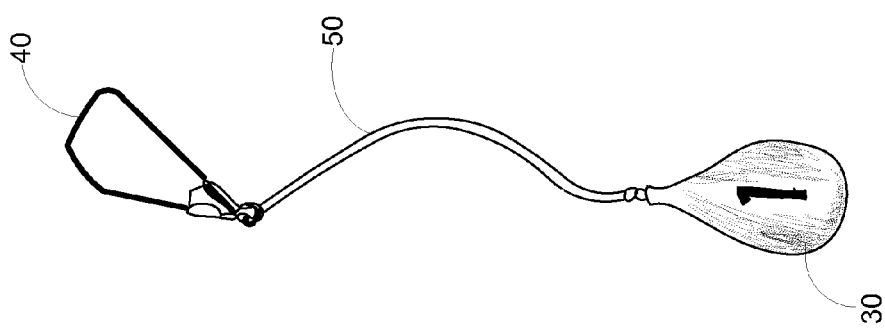
FIG. 2 is a drawing of a typical fish culling buoy.

FIG. 1 is a perspective view of a culling system comprising one embodiment of a buoy holder containing a set of culling buoys. FIG. 2 is a drawing of a typical fish culling buoy. The exemplary embodiment of the buoy holder depicted in FIG. 1 is comprised of a series of tubes 10 molded together, or otherwise connected to each other. Affixed to the tube structure are tabs 20 provided primarily for the purpose of mounting the buoy holder to a surface, such as the underside of a live well hatch, storage compartment, or some other surface found in a boat. Even so, it should be appreciated that the choice of mounting location, and the means of mounting to the chosen location, will occur to those skilled in the art and, as such, is not a limiting aspect of the present invention. However, particular mounting configurations may in and of themselves be considered novel aspects of various embodiments of the invention. As such, the particular mounting means depicted in FIG. 1, and described herein, is provided as an illustrative and enabling embodiment but, the present invention may also be employed in other embodiments.

Figure 3:
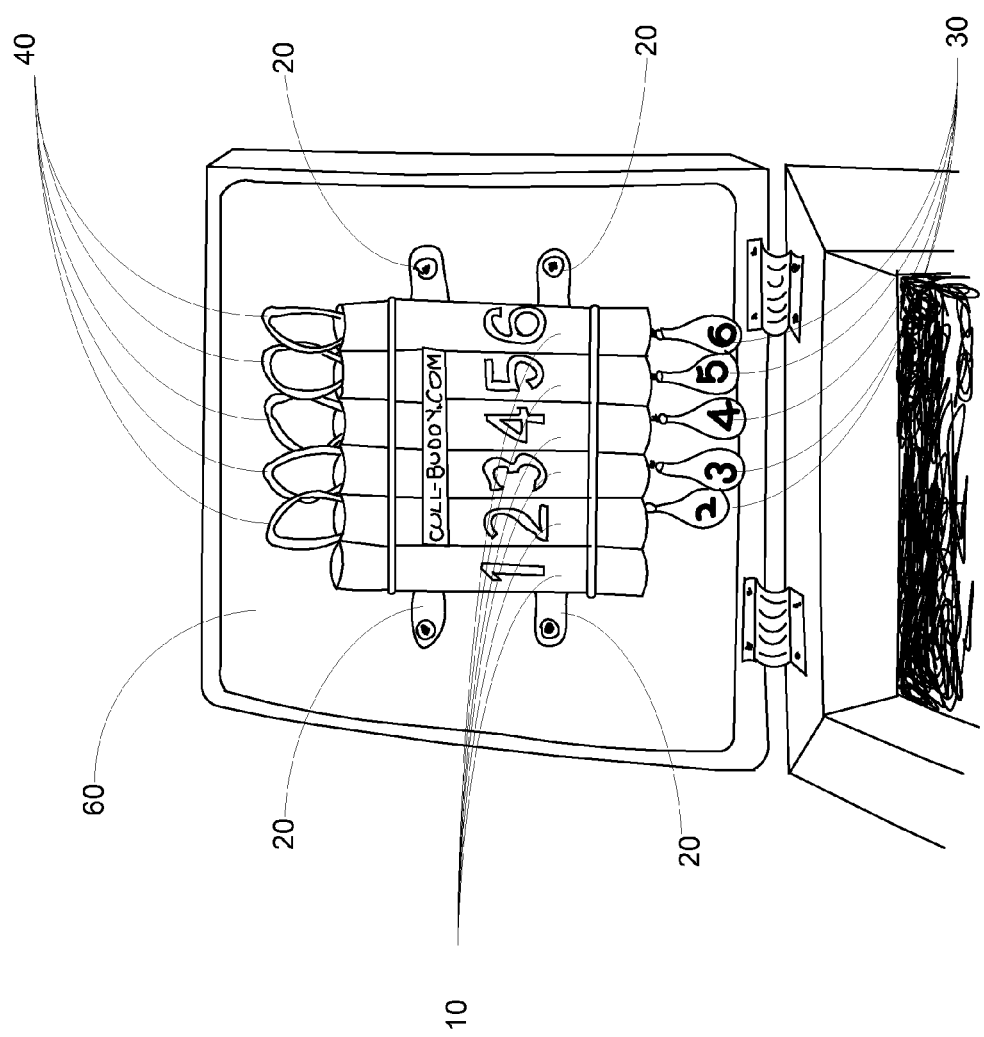
FIG. 3 is a perspective view of a culling system that is mounted to the underside lid of a live well or cooler.

FIG. 3 is a perspective view of a culling system that is mounted to the underside lid 60 of a live well or cooler.

As previously described, in an exemplary embodiment the tubes 10 are molded or affixed together such that each of the tubes shares the same plane with each of the other tubes. Further, each tube 10 has a bore that is open at each end. More specifically, the tubes 10 are sized in length and diameter such that a culling buoy (see FIG. 2) may be inserted down through the bore of a tube 10, with a float 30 first orientation, until the float 30 dangles below the lower open end of the tube 10. Once in place such that the float 30 dangles below the lower open end of the tube 10, the tether 50 portion of the buoy is protected and contained within the bore of the buoy holder tube 10. Advantageously, while tube bore sizes are large enough to permit the passing of a buoy float 30 and tether 50, the bore sizes are small enough that the clipping apparatus 40 positioned on the opposite end of the buoy cannot pass. In this way, each buoy is held in its individual tube 10 primarily via the buoy float 30 weight providing a gravitational force downward on the oversized clip 40. Again, it should be appreciated that the preferred means of securing individual buoys in individual sections of a buoy holder will occur to those skilled in the art and, as such, the description of an undersized tube bore relative to buoy clip size is not a limiting aspect of all embodiments of the present invention. The particular means for securing buoys in the buoy holder depicted in FIG. 1, and described herein, is provided for illustrative and enabling purposes only. Regardless of the particular embodiment of the present invention, an aspect of the buoy holder is that each buoy, once installed in the buoy holder, is effectively organized and separated from other buoys.

Additionally, embodiments of a buoy holder may include organizational features such as color, letter, and/or number coding. Such coding on the buoy holder may correlate with individual buoys and create an even more efficient culling system. The particular coding systems employed with a buoy holder will occur to those skilled in the art and should not be considered as a limiting aspect or feature of the present invention.

In some embodiments of the present invention, the structure of the tubes may be organized such that when the holder is mounted to a surface, a slight angle of the tubes is realized. For instance, in an embodiment where the culling buoy holder is attached to the inside lid of a live well, the tubes may be angled such that when the live well lid is closed, the tubes angle down from the opening that holds the clipping apparatus end of the tube is elevated higher than the buoy end of the tube. This feather, along with the gravitational force of the buoy, further facilitates holding the culling buoy in place while the boat is in transit or when the live well lid is opened and slammed shut.

In another embodiment of the invention, the culling buoy holder, be it a tube, cup or other holder, may include a hook or protrusion in one end of the tube. In such an embodiment, the culling buoy can be inserted into the holder and the buoy portion can inserted into the holder and the clip can be placed over the hook or protrusion. In some embodiments, the hook may include a caliper type configuration to further facilitate holding of the clip. In other embodiments, the hook may be a loop that the clip can be threaded through and then closed to secure the culling buoy in place. In yet another embodiment, the culling system may be mounted to a surface and a hook, protrusion or loop may be affixed to the surface slightly above the openings of the holders. Again, the clip can then be held in place as previously described.

In another embodiment of the invention, the culling buoy holder may be integrated into a live well lid or the lid of a cooler. For instance, the tubes can be molded into the lid of the live well or cooler in any of the above-mentioned configurations. In addition, it should be appreciated that the culling buoy holder may also be mounted or integral to a side of a live well or cooler (either interior or exterior). Furthermore, the culling buoy holder may also be integral to other devices, such as a boat, a dock, a fishing vest, a bait bucket, waders, seat back, etc.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A system for holding a plurality of culling buoys and preventing them from being entangled until retrieved for use, the system comprising:
    a plurality of tubes affixed in a single configuration and mounted parallel to each other, side by side such that adjacent tubes are touching and further, wherein each tube of the plurality of tubes includes an upper opening and a bottom opening;
    a mounting system for mounting the plurality of tubes to a surface in an interior region defined by a plurality of walls of a live well;
    a plurality of culling buoys with each culling buoy having a lead, a float attached to one end of the lead, and a clip attached to an opposing end of the lead from the float;
    each of the plurality of tubes defining a tube interior that is of a particular diameter over a length of the tube, the particular diameter being larger than a largest diameter width-wise of the float such that the float can be received into the tube through the upper opening, pass through the interior of the tube and exit through the bottom opening of the tube, and the particular diameter being smaller than at least one width of the clip such that the clip cannot enter into the interior of the tube through the upper opening, the lead of the culling buoy being a length sufficient to allow the float of the culling buoy to at least partially extend out of the bottom opening of the tube when the clip is resting against edges of the tube defining the upper opening.

2. The system of claim 1, wherein said mounting system is operable to mount to an underside of a lid of the live well.

3. The system of claim 1, wherein said mounting system is operable to mount to an underside of a lid of the live well in such a configuration that when the lid is opened, the top openings of the tubes associated with the culling buoy clips are raised above the bottom openings, thereby preventing any culling buoys from sliding out of the tubes.

4. The system of claim 1, further comprising a coding system that is visibly placed on each tube and each culling buoy such that the coding system provides a means for corresponding each of the plurality of tubes with a specific culling buoy.

5. A system for holding culling buoys comprising:
    a plurality of tubes affixed in a single configuration and mounted parallel to each other, side by side such that adjacent tubes are at least approximately touching along sides thereof with each tube having an upper opening and a bottom opening;
    a plurality of culling buoys with each culling buoy having a lead, a float on one end of the lead, and a restraint on an opposing end of the lead from the float;
    each of the plurality of tubes defining a tube interior that is of a diameter sufficient to receive the float of a culling buoy inserted into the upper opening of the tube allowing the float to pass through the tube such that it exits through the bottom opening of the tube and the restraint having dimensions to prevent the restraint from completely entering into the interior of the tube through the upper opening;
    the lead of the culling buoy having a length to allow the float of the culling buoy to at least partially extend out of the bottom opening of the tube when the restraint is resting against edges of the tube defining the upper opening of the tube;
    each tube including a unique identifier element and each float of each culling buoy including a unique identifier that matches the unique identifier on only one of the tubes; and
    a mounting system for mounting the plurality of tubes to a surface.

* * * * *